May 16, 1944.    L. S. DEWEES    2,348,884
BRAZING APPARATUS
Filed Jan. 1, 1943

INVENTOR
L. S. DEWEES
BY Harry L. Duft
ATTORNEY

Patented May 16, 1944

2,348,884

UNITED STATES PATENT OFFICE 2,348,884

BRAZING APPARATUS

Leonard S. Dewees, Baltimore, Md., assignor to Western Electric Company, Incorporated, New York, N. Y., a corporation of New York Application January 1, 1943, Serial No. 470,989

6 Claims. (Cl. 219—12)

This invention relates to brazing apparatus and more particularly to apparatus for brazing the ends of copper strips to form continuous webs.

It is an object of the present invention to provide a simple and efficient apparatus for rapidly effecting brazing operations.

In accordance with one embodiment of the invention, two copper strips, which are to be attached one to another to form a continuous web, are clamped by eccentric clamps in position to hold tapered ends thereof in abutting relation after a small amount of silver solder has been applied to the tapered surfaces. The clamps will hold the strips with the abutting surfaces positioned between a pair of carbon electrodes, one of which is connected to one side of a current source and the other of which is connected to the other side of the current source. One of the carbon electrodes is supported on a bracket, which also supports the clamps, and the other electrode is mounted on a pivoted handle insulated from the base of the apparatus and having a pair of oppositely disposed conducting and supporting bands for supporting the movable electrode.

Figure 1:
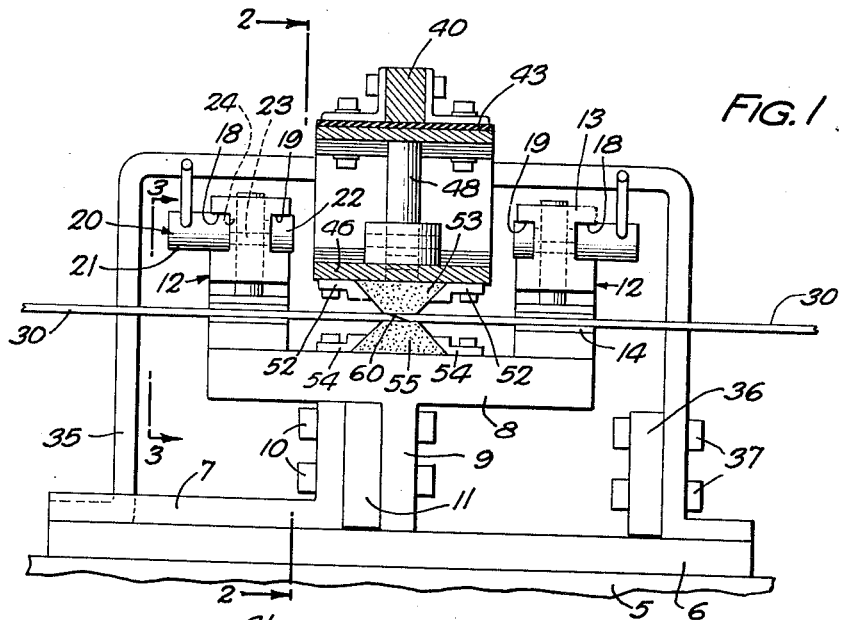
Figure 2:
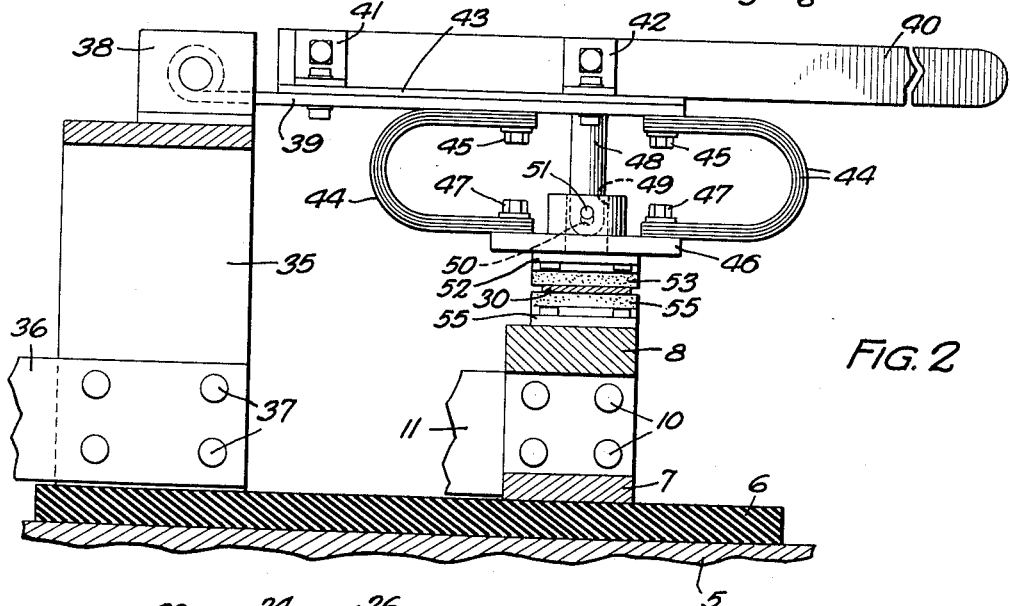
Figure 3:
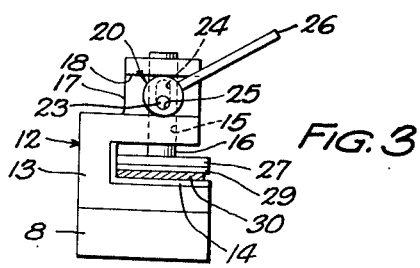

A better understanding of the invention may be had by reference to the following detailed description when considered in conjunction with the accompanying drawing, wherein Fig. 1 is a front elevational view, partly in section, showing a brazing apparatus constructed in accordance with the present invention;

Fig. 2 is a vertical sectional view taken substantially along the line 2—2 of Fig. 1 in the direction of the arrows; and Fig. 3 is a fragmentary sectional view taken substantially along the line 3—3 of Fig. 1 in the direction of the arrows showing the details of the construction of the clamps which hold the copper strips in place during the brazing operation.

Referring to the drawing, wherein like reference characters designate the same parts throughout the several views, it will be seen that the apparatus may be mounted upon any suitable table or support 5 on which there is fixed, in a suitable manner, a base plate of insulating material 6. Suitably attached to the base plate 6 is an L-shaped bracket 7 having a portion extending vertically to support a plate 8, which is provided with a downwardly extending projection 9 for attachment to the vertically extending portion of the L-shaped bracket 7 by means of bolts 10—10. Interposed between the vertically extending portion of the bracket 7 and the projection 9 is a bus bar 11 for supplying current to the plate 8. The bus bar 11 is connected to any suitable source of current.

On its upper surface, the plate 8 has fixed to it a pair of clamping assemblies 12, each of which comprises a U-shaped member 13 having set into it an insulator 14, which serves to insulate the upper surface of the lower portion of the U-shaped member. The upper leg of the U-shaped member 13 has an aperture 15 formed in it for receiving the shank of a movable clamping plunger 16. The upper surface of the U-shaped member 13 has formed integrally with it an upwardly projecting portion 17 provided with shoulders 18 and 19, which cooperate with the body of the U-shaped member 13 to provide guide slots for an eccentric driving member 20, which comprises two cylindrical portions 21 and 22 interconnected by a rod 23. The rod 23 rides in a slot 24 formed in the projection 17 and extends through an aperture 25 in the shank of the plunger 16, whereby when the eccentric driving member 20 is rotated by a handle 26 mounted for this purpose in the cylindrical portion 21, reciprocation will be imparted to the plunger 16. The plunger 16 has a head portion 27 on which there is mounted a plate of insulating material 29 adapted to be moved into engagement with one of a pair of strips of copper 30, the ends of which are to be connected together in the apparatus.

At the rear of the base plate 6, there is mounted a U-shaped bracket 35 having a bus bar 36 attached to it by means of bolts 37, the horizontally extending portion of the bracket 35 has attached to it a hinge member 38 for pivotally supporting a lever 39, to which there is attached a handle 40, brackets 41 and 42 being provided for attaching the handle 40 to the lever 39. Interposed between the handle 40 and the brackets 41 and 42 and the lever 39 is an insulator member 43 for electrically insulating the handle from the lever. A series of flexible conducting straps 44 are attached through the lever 39 and electrically connected thereto by means of bolts 45. The straps 44 are bent into a U-shaped configuration and have their lower ends fixed to an electrode support 46 by means of bolts 47. An arm 48 formed integrally with or suitably attached to the lever 39 extends into a slot 49 formed in the electrode support 46. The arm 48 has a slot 50 formed in it for receiving a retainer pin 51, which is fixed to the electrode support 46, whereby the electrode support may be moved relatively a small amount with respect to the arm 48.

Fixed to the underside of the electrode support 46 are a pair of clamps 52—52 for supporting and electrically connecting a carbon electrode 53 on the electrode support 46. A set of clamps 54, similar to the clamps 52, are mounted on the plate 8 and hold a carbon electrode 55 on the plate 8 in vertical alignment with the electrode 53.

A more complete understanding of the apparatus may be had by reference to the following brief description of the operation of the apparatus in brazing two strips 30 of copper together to form a continuous web. The ends of the strips 30, which are to be attached in abutting relation, are bevelled slightly, as shown at 60, prior to the insertion of the strips in the brazing apparatus and after the ends of the strips have been bevelled, the strips are inserted between the head 27 of the plungers 16 and the base of the U-shaped members 13 while the plungers 16 are in their upper position (the opposite of that shown in the various figures). Since the U-shaped members 13 and the head portions 27 of the plungers 16 have the insulators 14 and 29, respectively, attached to them, the copper strip 30 will be insulated from the rest of the apparatus and, by proper manipulation of the handle 26, may be clamped in position to hold the strips in the position shown in Fig. 1. Before the strips 30 are inserted in the apparatus to be brazed, some silver solder may be placed on the ends of the strips 30, where they are beveled at 60. After the strips 30 are thus positioned and clamped in place by the clamping assemblies 12, the handle 40 may be moved to the position shown in Fig. 2 and since the bus bar 11 is electrically connected, through the downwardly extending projection 9 and the plate 8, to the electrode 55 and the bus bar 36 is connected, through the bracket 35, the hinge member 38, lever 39, flexible straps 44 and electrode support 46, to the electrode 53, movement of the handle 40 to the position shown in Fig. 2 will close a circuit to the two electrodes. The closure of the circuit between the two electrodes will cause current to flow across the joint between the ends of the strips 30 and due to the heat generated by the carbon electrodes 53 and 55 and by the resistance across the abutting ends of the strips, the silver solder will be melted and the joint brazed. When the handle 40 is moved to the position shown in Fig. 2, the electrode 53 will engage the strips 30 and the straps 44 will flex as movement of the handle 40 continues until the pin 51 engages the top of the slot 50, whereupon pressure may be exerted through the carbon electrodes on the abutting ends of the strips and the electrode support 46 will accommodate itself to the contour of the strips to exert an even pressure throughout the area of contact between the electrodes and the strips.

What is claimed is:

1. In a brazing apparatus, a pair of carbon electrodes, means for supplying current to said electrodes, and means for supporting one of said electrodes comprising a handle, a pair of flexible leads constituting a part of the means for supplying current to one of the electrodes, an electrode support connected to said flexible leads, and means for pivotally supporting said electrode support for slight movement with respect to said handle.

2. A brazing apparatus comprising relatively movable carbon electrodes, means for supporting one of said electrodes in a fixed position, an electrode holder for the other electrode, handle means for manipulating the said other electrode, a pin and slot connection between the handle and electrode holder for permitting a limited amount of reciprocation and oscillation of the holder with respect to the handle, a current source, and means for connecting the electrodes to opposite sides of the current source.

3. A brazing apparatus comprising relatively movable carbon electrodes, means for supporting one of said electrodes in a fixed position, an electrode holder for the other electrode, handle means for manipulating the said other electrode, a pin and slot connection between the handle and electrode holder for permitting a limited amount of reciprocation and oscillation of the holder with respect to the handle, a current source, and means for connecting the electrodes to opposite sides of the current source, said last mentioned means including flexible leads to the electrode holder for tending to hold the holder in a predetermined position.

4. A brazing apparatus comprising relatively movable carbon electrodes, means for supporting one of said electrodes in a fixed position, an electrode holder for the other electrode, handle means for manipulating the said other electrode, a pin and slot connection between the handle and electrode holder for permitting a limited amount of reciprocation and oscillation of the holder with respect to the handle, a current source, and means for connecting the electrodes to opposite sides of the current source, said last mentioned means including a lever fixed to said handles, flexible leads interconnecting the lever and electrode holder for tending to hold the holder in a predetermined position.

5. A brazing apparatus comprising relatively movable carbon electrodes, means for supporting one of said electrodes in a fixed position, an electrode holder for the other electrode, handle means for manipulating the said other electrode, a pin and slot connection between the handle and electrode holder for permitting a limited amount of reciprocation and oscillation of the holder with respect to the handle, a current source, and means for connecting the electrodes to opposite sides of the current source, said last mentioned means including a lever fixed to said handle for operation thereby, means for pivotally supporting the lever and connecting it to the current source, and flexible leads interconnecting the lever and electrode holder for tending to hold the holder in a predetermined position.

6. A brazing apparatus comprising relatively movable carbon electrodes, means for supporting one of said electrodes in a fixed position, an electrode holder for the other electrode, handle means for manipulating the said other electrode, a pin and slot connection between the handle and electrode holder for permitting a limited amount of reciprocation and oscillation of the holder with respect to the handle, a current source, means for connecting the electrodes to opposite sides of the current source, said last mentioned means including a lever fixed to said handle for operation thereby, means for pivotally supporting the lever and connecting it to the current source, and flexible leads interconnecting the lever and electrode holder for tending to hold the holder in a predetermined position, and said pin and slot connection including an arm extending from the lever, a pocket in the electrode holder for receiving the end of the arm, a pin fixed in the sides of the pockets, and a slot in the arm for receiving the pin.

LEONARD S. DEWEES.